Figure 1:
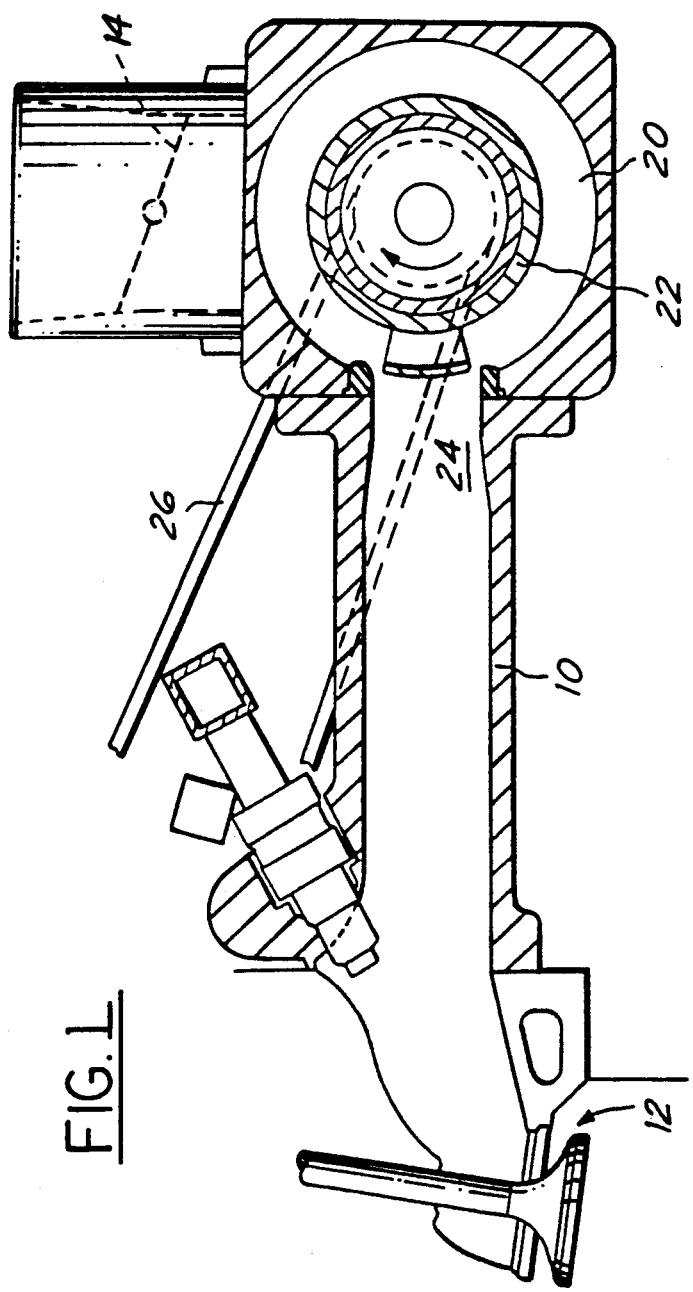

United States Patent [19]

Ma

[11] Patent Number: 5,085,177

[45] Date of Patent: Feb. 4, 1992

[54] MANIFOLD TUNING

[75] Inventor: Thomas T. Ma, Chelmsford, Great Britain

[73] Assignee: Ford Motor Company, Dearborn, Mich.

[21] Appl. No.: 663,900

[22] PCT Filed: Sep. 6, 1989

[86] PCT No.: PCT/GB89/01047

§ 371 Date: Mar. 11, 1991

§ 102(e) Date: Mar. 11, 1991

[87] PCT Pub. No.: WO90/02869

PCT Pub. Date: Mar. 22, 1990

[30] Foreign Application Priority Data

Sep. 9, 1988 [GB] United Kingdom ............... 8821191

[51] Int. Cl.⁵ ........................................... F02M 35/10
[52] U.S. Cl. ............................................ 123/52 MB
[58] Field of Search ......... 123/52 M, 52 MB, 52 MC, 123/52 MV, 52 MF, 52 ML, 323

[56] References Cited

U.S. PATENT DOCUMENTS

| | | | |
|---|---|---|---|
| 3,254,484 | 6/1966 | Kopper | 60/275 |
| 4,646,689 | 3/1987 | Katsumoto et al. | 123/52 MB |
| 4,890,582 | 1/1990 | Schatz et al. | 123/52 MF |
| 5,018,485 | 5/1991 | Washizu et al. | 123/52 MB |

FOREIGN PATENT DOCUMENTS

| | | |
|---|---|---|
| 0141165 | 5/1985 | European Pat. Off. . |
| 0194503 | 9/1986 | European Pat. Off. . |
| 2203488 | 10/1988 | United Kingdom . |

Primary Examiner—David A. Okonsky
Attorney, Agent, or Firm—Jerome R. Drouillard; Clifford L. Sadler

[57] ABSTRACT

The invention relates to a manifold system for an internal combustion engine comprising a shutter (22) serving as an externally controlled source of pressure waves disposed within a tract (10) and activated at a predetermined time preceding the closing of an associated engine valve (12) such that the pressure pulse from the shutter reaches the associated valve (12) as it is closing during each engine cycle.

6 Claims, 1 Drawing Sheet

MANIFOLD TUNING

The present invention relates to the tuning of inlet and exhaust manifold systems of internal combustion engines.

It is well known that some degree of supercharging can be achieved by selecting the length of the intake system to take advantage of the pressure waves caused by the rapid opening of the intake valve, which pressure wave propagates back and forth along the intake tract in a series of compression and rarefaction waves. By choosing the tract length such that the time taken for the compression wave to arrive back at the intake valve is approximately the same as the time interval of the intake valve opening period, the density of the intake charge as it is being trapped inside the engine cylinder can be momentarily increased thereby increasing the power output of the engine.

As the speed of sound is substantially constant (approx. 350 m/s in air), the time taken for the pressure wave to traverse an intake tract of fixed length for a fixed number of reflections is also constant. On the other hand, the duration of the intake event, if constant when expressed in terms of crankshaft angle, will vary inversely with engine speed. Thus, the time from the start of the pressure wave perturbation to the instant when the intake valve closes is not constant and progressively shortens with increased engine speed. It will be clear from this that for a fixed length of intake tract, there is only one speed at which the desired matching or tuning of the intake tract is achieved. The resulting torque curve for such an engine would exhibit a narrow high peak at the tuned engine speed and the torque would fall off rapidly on each side of this peak.

Variably tuned intake systems have attempted to achieve increased torque over a broader speed range by providing a control enabling the length of the intake tract to be varied in dependence upon engine speed in order to match the changing time delay requirements.

The tuning of engine manifolds to take advantage of pressure waves is not restricted to the intake system but can also be used in exhaust systems. In the case of exhaust manifolds, tuning is used to achieve improved scavenging, that is to say removal of residual exhaust gases from the combustion chamber. Here, a negative pulse is required at the exhaust valve as it is being closed.

Manifold tuning can furthermore be employed not only to increase engine power output but to derate an engine under part load operation. Thus, it is possible in the case of an intake system to arrange for a negative pulse to be present during intake valve closing as this reduces the mass of air without throttling, thereby reducing pumping losses.

Both the fixed length and variable length manifold systems previously proposed are passive systems in as much as the pressure wave perturbation used to alter the charge density is created by the engine itself and the various designs of the manifold systems have only been intended to optimise the phasing of a process which occurs naturally within the engine.

U.S. Pat. No. 3,254,484 proposes the use of acoustical resonators and sound generators in intake and exhaust systems to achieve effects similar to manifold tuning. However, this patent does not identify a sound generator which can produce sound waves having sufficient energy to alter the intake charge significantly and relies instead predominantly on acoustical resonance.

The present invention does share with the tuned manifold system described above the fact that a shock or sound wave is employed to vary charge density at the instant of valve closing but seeks to provide greater control over the process so as to enable regulation of the breathing efficiency to be achieved over a wide range of engine speeds.

In other known systems, such as EP-A-0194503, GB-437321 and EP-A-0141165 a secondary valve is placed in series with the inlet valve and remains closed for some length of time after the inlet valve has opened. The effect of this is to develop a drop in pressure in the cylinder, which starts a surge of air flow when the secondary valve opens. The negative pressure wave created by this surge travels the length of the manifold away from the cylinder and is reflected as a positive pressure wave to increase the cylinder pressure at the instant of closing of the main inlet valve.

The time of opening of the secondary valve is important if the positive pressure wave is to reach the main inlet valve as it is closing. This timing must be varied as a function of engine speed and at some speeds the intake process may not commence until long after top dead centre (TDC). The effect of this is two fold. First, the piston must do work to develop a vacuum and this reduces the available output power. Secondly, the shortening of the effective air intake event reduces the steady flow volumetric efficiency and this counteracts the benefit of the positive pressure wave at the instant of closing of the main inlet valve.

In U.S. Pat. No. 4,691,670 a valve with variable opening and closing times is arranged in series with the main inlet valve. The valve is initially closed when the main valve is opened to create a vacuum in the inlet manifold. When the secondary valve opens, the air column starts moving with a higher velocity than would occur with normal induction and by correctly timing the opening one can ensure that the column of air reaches the main inlet valve with high velocity as the latter is closing and increase the charge density in the cylinder by the ram effect of the moving air column. The variable closing time is intended to prevent back flow from the cylinder. This system relies on the inertia of a moving column of air and not on the pressure wave associated with the propagation of a sound wave. Pumping losses also occur as the piston tries to generate a vacuum in the inlet manifold, but such losses are not significant when the engine is operating under full load.

According to the present invention, there is provided an internal combustion engine having a plurality of cylinders each with a camshaft operated main inlet and main exhaust valve, and a manifold system which comprises a plurality of tracts each leading to a main valve of a respective cylinder and a plurality of secondary valves each disposed at a distance along one of the tracts in series with a respective main valve and arranged to open and close at an engine speed dependent phase angle relative to the valve camshaft during each engine cycle so as to create a pressure wave which propagates at the speed of sound at least once along the length of the tract and reaches the associated main valve as the latter valve is closing, characterised in that each secondary valve is open at the instant of opening of the associated main valve and is operative, while the associated main valve remains open, to interrupt for a predetermined cranking angle the flow of the column of air in the section of the tract between the secondary valve and the associated main valve, thereby creating the desired pressure wave, the latter propagating initially in the direction of the main valve.

As compared with the above prior art references, for example EP-A-0194503, the invention offers the advantage that the duration of obstruction of the manifold while the main valve is open is fixed in cranking angle and as a result there is no variation in event duration with engine speed tending to reduce the steady flow volumetric efficiency. The benefit of pressure wave tuning can thus be obtained over a larger range of engine speeds. Also, because only a brief interruption is required, there are no significant pumping losses suffered by the piston.

An important advantage of the use of an active system of pressure wave generation is that one is no longer tied to tuned lengths and one can instead vary the timing of the pressure pulse to suit the existing manifold tract length. Previously, to achieve tuning at low engine speeds required long tracts which were difficult to package within the engine compartment of road vehicles and the technique of intake manifold tuning was used mostly on racing cars where the tuned manifold lengths are shorter because of the higher engine speeds.

The most common requirement for such an intake system is to increase the volumetric efficiency under full load and the system will therefore most frequently be employed in the intake manifold to produce a positive pressure pulse for each intake valve as it is closing. It will be clear, however, that the system can equally be used to derate the engine under part load by transmission of a negative pressure pulse and can be used in an exhaust system to improve scavenging.

An advantage of the secondary valve used in the present invention to generate a pressure wave is that the power in the pulse is derived from the air flow itself rather than by the pumping action of the piston. Indeed the presence of the dynamic tuning system is hardly evident to the piston at the instant the shutter closes, the only difference noticeable being a brief surge of pressure caused by the arrival of the pressure wave.

Shuttering of fluid streams is, of course, well known as a source of pressure pulses, this being well demonstrated by the effect of water hammer.

The secondary valves, which may be constructed as shutters, should be arranged to send a wave to the associated cylinders but to no other cylinder. Thus, in the case of a fuel injection system with individual intake tracts connected to a plenum chamber, one shutter for each cylinder may be arranged within the plenum chamber facing the associated the tract without restricting the air flow into it.

Because of the total enclosure of the shutters within the intake manifold system, noise nuisance may be negligible but where the sound emitted is objectionable then it may be counteracted by a source of anti-sound as the source of the sound is localised.

The activation of the shutters must be correctly timed relative to the valve closure to achieve the desired effect. The mechanism required for achieving this aim is no different in principle from the mechanism needed for achieving spark timing.

It is preferred that the shutters should be rotary shutters consisting of a part-cylindrical vane rotating in a cylindrical cavity and serving periodically to close the tract leading to the associated valve. A variable phase mechanism may couple the rotary vane for rotation at the same speed as but with variable phase relative to the camshaft.

Figure 2:
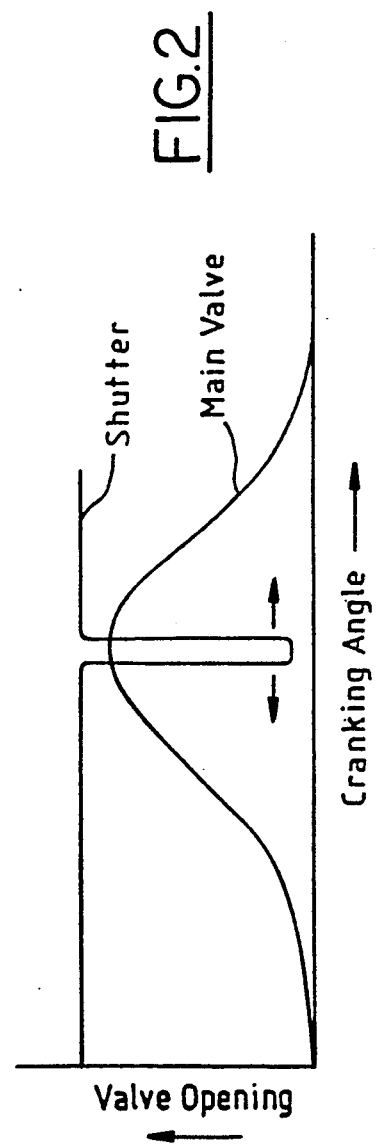

The invention will now be described further, by way of example, with reference to the accompanying drawings, in which:

FIG. 1 is a schematic section through an embodiment of the present invention, and FIG. 2 is a diagram showing the opening angles of the main valve and the shutter.

A tract 10 of an intake manifold leads from the main butterfly valve 14 which controls the engine speed to the intake port 12 of one of the engine cylinders. The tract includes a cylindrical chamber 20 within which there is arranged a rotary shutter 22 having a part-cylindrical vane 24. As the shutter 22 rotates, the air flow down the tract is interrupted when the vane 24 blocks the tract 10 but is unrestricted otherwise.

As the pressure pulses in this case are of the wrong sign to increase engine performance, they are timed to reach the valve port 12 after reflection at an open end of the tract to cause it to be inverted.

The timing of the opening of the valve and the shutter 22 are shown by the timing diagram of FIG. 2. It will be noted that when the main valve starts to open, the shutter 22 is already fully open and there is no increased pumping by the piston in the first part of its down stroke. The shutter is closed briefly while the valve is open and the full duration of the obstruction by the shutter is determined by the circumferential length of the vane on the shutter and is therefore of fixed cranking angle. Because of the separation of the shutter 11 from the valve, the moving air column between them will act as a weak spring making the obstruction almost imperceptible by the piston. The kinetic energy of part of the air flow is nevertheless converted by the interruption into potential energy stored in a pressure wave which propagates at the speed of sound towards the valve and eventually produces the desired pressure wave tuning of the manifold.

The air flow and fuel metering are controlled in a conventional manner. The throttling of the air flow and the fuel metering may be carried out upstream or downstream of each shutter.

If increased power output is required, it is arranged for a positive pressure pulse to compress the charge while the inlet valve is closing. The wave propagating from the shutter takes a finite predetermined time to reach the inlet valve. The shutter must therefore be activated a fixed time before inlet valve closure and the control for the shutter is achieved in the same manner as the control of the spark timing. In the illustrated embodiment, the shutter 22 is driven by a belt 26 from the engine camshaft and a variable phase mechanism is included in the transmission train to vary the phase of operation with engine sped. The variable phase mechanism may be externally controlled or it may employ centrifugal fly weights.

In a conventional or passive tuned manifold, it is believed that the opening of the inlet valve causes transmission of a positive pressure or compression pulse towards the open end of the tract. This pulse is inverted and reflected a the open end so that a negative pressure or rarefaction pulse is sent back to the valve. This negative pressure pulse is reflected without inversion from the closed combustion chamber back towards the open end and after a further reflection with inversion against reaches the inlet valve as a compression pulse to compress the charge as the valve is closing. The pressure pulse is thus attenuated by passing four times up and down the intake tract and by three imperfect reflections at the open and closed ends of the tract.

In the present invention, by contrast, the active generation of the pressure pulse enables a more powerful and better controlled pressure pulse to be created, and the pulse need not be attenuated by long propagation paths and multiple reflections. The extent to which the charge density can be modified may therefore be potentially greater than can be achieved by passive tuning and the control can be made to extend over a broad range of engine speeds without any alteration to the length of the intake manifold and without creating the packaging problems of large passive tuned manifolds.

In the case of a fuel injected engine, as illustrated, the chambers 20 of the different cylinders may be joined to form the plenum chamber connected by way of a common throttle 14 to an air filter box. The tracts 10 in this case are the ducts leading from the plenum chamber to the individual engine cylinders.

It is possible to provide an external source of anti-sound if the noise generated by the shutter 24 is found to be objectionable. Because the timing of the noise source is predictable, almost complete cancellation of the sound can be achieved by suitable control and positioning of the source of anti-sound.

The invention has been described above by reference to a mechanical shutter as the secondary valve. It is alternatively possible to use a fluidic device as a throttling device in place of a mechanical shutter. Such fluidic devices are known per se and are sometimes referred to as vortex amplifiers. In a typical vortex amplifier, a disc like chamber has an axial exit port, a radially directed intake port and a tangentially directed control port. In the absence of a flow into the control port, fluid flow follows a short generally radial path from the intake port to the exit port and encounters little resistance. With a small control flow, the main flow is forced into a swirl or vortex and encounters much greater resistance on account of the increased path length from the intake port to the exit port. Thus, such a device acts as a secondary valve controlled by the supply of fluid to its control port.

The advantage of such an embodiment is that the timing of the secondary valve can be controlled at will using solenoid valves to switch the control flow on and off and has no mechanical parts to wear out or cause friction. Furthermore, the interruption can be more sudden and briefer than when using a mechanical shutter because of the limitations imposed by the physical size of a mechanical shutter blade.

It has been found experimentally, using a mechanical shutter for the secondary valve, that an improvement of some 10% in the volumetric efficiency can be achieved by correctly timing the shuttering as a function of engine speed. With a tract length of 700 mm, the best improvement is achieved at 2000 r.p.m. with the shutter closing at 75° ATDC during the intake stroke. The improvement in volumetric efficiency is a function of both timing and the intensity of the wave generated. It is important that the timing should correspond to the arrival time of the positive pressure pulse at the inlet valve while it is closing and this determines the timing, that is the crank angle, uniquely for any given engine speed. The reason that the improvement in efficiency varies with engine speed is that the energy in the moving air column varies with crank angle and the energy in the sound pulse created by shuttering the moving column will change with the crank angle at which the shutter closes. Thus at engine speeds other than 2000 r.p.m., in the example given above, the improvement that can be achieved is only a fraction of the optimum value.

The speed at which the improvement is optimised is dependent upon the tract length and by altering the tract length one can maximise the improvement in volumetric efficiency at different engine speeds.

I claim:

1. An internal combustion engine having a plurality of cylinders each with a camshaft operated main inlet and main exhaust valve, and a manifold system which comprises a plurality of tracts each leading to a main valve of a respective cylinder and a plurality of secondary valves each disposed at a distance along one of the tracts in series with a respective main valve and arranged to open and close at an engine speed dependent phase angle relative to the valve camshaft during each engine cycle so as to create a pressure wave which propagates at the speed of sound at least once along the length of the tract and reaches the associated main valve as the latter valve is closing, characterised in that each secondary valve is open at the instant of opening of the associated main valve and is operative, while the associated main valve remains open, to interrupt for a predetermined cranking angle the flow of the column of air in the section of the tract between the secondary valve and the associated main valve, thereby creating the desired pressure wave, the latter propagating initially in the direction of the main valve.

2. An engine as claimed in claim 1, wherein the manifold system an intake system and the secondary valve is a shutter activated to produce a negative pressure pulse which reaches the associated intake valve as it is closing as a positive pressure pulse, having undergone at least two reflections at the ends of the manifold, the pressure wave serving to increase the density of the trapped charge and thereby increase engine performance.

3. An engine as claimed in claim 1, wherein the manifold system is an intake system and the secondary valve is a shutter activated to produce a pulse which reaches the associated intake valve as it is closing as a negative pressure pulse, whereby to reduce the density of the trapped charge and thereby derate engine performance.

4. An engine as claimed in claim 1, wherein the manifold system is an exhaust system and the secondary valve is a shutter activated to produce a pulse which reaches the associated exhaust valve as it is closing as a negative pressure pulse, whereby to improve scavenging of residual exhaust gases.

5. An engine as claimed in claim 1, wherein the secondary valve is a rotary shutter consisting of a part-cylindrical vane rotating in a cylindrical cavity and serving periodically to close the tract leading to the associated main valve.

6. An engine as claimed in claim 5, wherein a variable phase mechanism serves to couple the rotary vane for rotation with the camshaft but with a variable phase relative to the camshaft.

* * * * *